United States Patent
Kang et al.

(10) Patent No.: US 7,493,692 B2
(45) Date of Patent: Feb. 24, 2009

(54) METHOD FOR MAKING PLATE-SHAPED HEATING PANEL OF UNIFORM FLOW PATH

(75) Inventors: Se-Chang Kang, Cheongju-si (KR); Jang-Seok Park, Cheongju-si (KR); Kyoung-Myoung Chae, Daejeon (KR); Min-Soo Han, Kimpo-si (KR); Seong-Chan Park, Cheongju-si (KR); Sung-Seock Hwang, Cheongju-si (KR)

(73) Assignee: LG Chem, Ltd. (KR)

( * ) Notice: Subject to any disclaimer, the term of this patent is extended or adjusted under 35 U.S.C. 154(b) by 506 days.

(21) Appl. No.: 11/221,226

(22) Filed: Sep. 7, 2005

(65) Prior Publication Data

US 2006/0054163 A1    Mar. 16, 2006

(30) Foreign Application Priority Data

Sep. 7, 2004    (KR) .................... 10-2004-0071094

(51) Int. Cl.
  *B21D 39/06*    (2006.01)
  *B21D 53/02*    (2006.01)
  *B23P 6/00*    (2006.01)
  *F28F 3/14*    (2006.01)

(52) U.S. Cl. ............................. 29/890.03; 29/890.032; 29/890.038; 29/890.039; 29/890.045; 165/170

(58) Field of Classification Search ............. 29/890.03, 29/890.032, 890.038–890.039, 890.045; 165/170
See application file for complete search history.

(56) References Cited

U.S. PATENT DOCUMENTS

| 3,871,060 | A | * | 3/1975 | Ladney, Jr. ................. 29/428 |
| 5,034,076 | A | * | 7/1991 | Masui et al. ................. 156/79 |
| 5,080,166 | A | | 1/1992 | Haugeneder ................. 165/56 |
| 5,205,348 | A | * | 4/1993 | Tousignant et al. .......... 165/46 |
| 7,234,763 | B2 | * | 6/2007 | Gupta et al. ................. 296/208 |
| 7,241,412 | B2 | * | 7/2007 | Cesano ....................... 264/250 |

FOREIGN PATENT DOCUMENTS

KR    2002-0095733    12/2002

* cited by examiner

*Primary Examiner*—David P Bryant
*Assistant Examiner*—Alexander P Taousakis
(74) *Attorney, Agent, or Firm*—Cantor Colburn LLP

(57) ABSTRACT

Disclosed herein is a method for manufacturing a heating panel. The method comprises preparing upper and lower moulds corresponding to the upper and lower plates, injecting a plastic material into the moulds to produce semi-manufactured products of the upper and lower plates, and bonding the semi-manufactured products of the upper and lower plates to produce the heating panel. The heating panel comprises a uniform fluid pathway formed therein, and allows uniform flow of heating fluid. The heating panel is manufactured by injection molding, thereby preventing blockage of the heating panel to ensure uniform flow of heating fluid. In addition, since the upper and lower plates are formed to a uniform thickness by injection molding, the method of the present invention enables precise forming of the heating panel, thereby allowing a constant tolerance and high quality of the heating panel.

1 Claim, 4 Drawing Sheets

METHOD FOR MAKING PLATE-SHAPED HEATING PANEL OF UNIFORM FLOW PATH

This application claims the benefit of the filing date of Korean Patent Application No. 10-2004-71094 filed on Sep. 7, 2004 in the Korean Intellectual Property Office, the disclosure of which is incorporated herein in its entirety by reference.

TECHNICAL FIELD

The present invention relates to a method for manufacturing a heating panel with an inner fluid pathway formed therein, and more particularly to a method for manufacturing a plate-shaped heating panel which comprises a uniform inner fluid pathway formed therein to enhance heating performance and fluidity of heating fluid.

BACKGROUND ART

Generally, a heating system, having been applied to residential buildings, such as houses, villas, and apartments, employs a structure involving a wet heating process, in which a pipe, laid under a flooring material of a room in a building, is supplied with heating fluid, such as hot water, thereby heating the room of the building. However, such a wet type heating system has a lower heating efficiency, resulting in severe thermal loss, and requires lengthy concrete curing, resulting in extended construction time. Furthermore, upon leakage of water from the pipe, a mortar layer of the heating system must be broken for repair, thereby impeding easy overhaul while increasing overhaul costs.

In order to solve the problems of the conventional wet heating system as described above, a dry heating panel, made of concrete, a synthetic resin or yellow clay was developed. A pipe is embedded within the dry heating panel for carrying heating fluid therein or the dry heating panel is provided with grooves or fixing members for inserting the pipe for carrying heating fluid. The dry heating panel is an assembly heating panel, and has advantageous effects in that the construction of the heating system may be completed by simply assembling prefabricated pieces of the dry heating panel, thereby reducing construction time, and simplifying maintenance and overhaul operations thereof. However, the dry heating panel has problems in that, since it adopts a line heating structure in which heat is concentrated where the pipe for carrying heating fluid is located, generating a severe temperature variation in the heating system, the dry heating panel is ineffective in view of heating efficiency, and in that, since the pipe itself is made of metal or a synthetic resin, it is expensive, resulting in increased construction costs. Furthermore, thermal loss may occur on the pipe, and a dewing phenomenon may occur on the surface of the pipe, thereby wetting the panel.

In order to solve the problems of the conventional dry heating panel described above, as disclosed in U.S. Pat. No. 5,080,166 and Korean patent application Laid-open publication No. 2002-95733, a plate-shaped heating panel comprising an inner fluid pathway formed therein to allow the heating fluid to flow therethrough was developed. Compared with the dry type heating system adopting the line heating structure, the plate-shaped heating panel having the inner fluid pathway therein adopts a planar heating structure in which the heating fluid flows not in a local area but in an overall area of panels. Thus, the plate-shaped heating panel provides very high heating efficiency, resulting in reduction of fuel expenses, and it does not require installation of the pipe, thereby eliminating a complicated piping process and reducing the piping expenses. Additionally, the plate-shaped heating panel is not subject to thermal loss and the dewing phenomenon, which usually occurs on the surface of the pipe in the structure of the dry heating panel, and allows a weight of the panel to be reduced. Furthermore, the plate-shaped heating panel is very easy to construct and repair.

Conventionally, the plate-shaped heating panel with an inner fluid pathway formed therein was formed by way of blow molding, also known as hollow molding. The blow molding is a molding method in which a hollow product is formed by blowing air into a separating mold, in which molten thermoplastic forming material is inserted and then softened with heat. More specifically, the blowing molding fundamentally comprises three steps, namely a) preparing a parison or a preform previously formed from a plastic resin into a tube shape, b) positioning the parison in a cavity of the mold and blowing air into the parison to expand the plastic resin until the plastic resin reaches a wall of the closed mold, and c) curing the plastic resin, followed by ejecting a final product by opening the mold.

However, when manufacturing the plate-shaped heating panel comprising the inner fluid pathway formed therein by using the blow molding, since hot air is blown into the parison with non-uniform pressure, which is a characteristic of the blow bolding, areas of upper, lower, right and light sections of the fluid pathway are different in the final heating panel. In addition, when the pressure of the air is lower than a desired pressure or the fluidity of the molten resin is increased, some portion of the fluid pathway can be blocked to cause non-uniform flow of the heating fluid in the heating panel and variation in thickness of upper and lower plates of the heating panel.

When the non-uniform flow of the heating fluid and the variation in thickness of the upper and lower plates of the heating panel occur, heating performance of the panel is deteriorated. In other words, variation in temperature can occur on the floor of the room, it takes a long time to heat the room to a predetermined temperature, and the speed of the heating fluid is lowered due to resistance applied to the heating fluid in the heating panel.

DISCLOSURE

Technical Problem

Therefore, the present invention has been made in view of the above and other problems, and it is an object of the present invention to provide a method for manufacturing a heating panel which comprises a uniform inner fluid pathway without thickness variation formed therein to enhance heating performance and fluidity of heating fluid.

Technical Solution

In accordance with an aspect of the present invention, the above and other objects can be accomplished by the provision of a method for manufacturing a heating panel comprising upper and lower plates integrally formed to face each other so as to form an inner fluid pathway in which heating fluid flows, a plurality of connecting members, each symmetrically extending from the upper and lower plates toward the lower and upper plates, respectively, to connect the upper and lower plates to each other, the inner fluid pathway formed inside the plate by the plurality of connecting members, and two fluid communication portions to supply and discharge the heating fluid, which comprises: preparing upper and lower moulds corresponding to the upper and lower plates; injecting a plastic material into a cavity between the moulds to produce semi-manufactured products of the upper and lower plates; and bonding the semi-manufactured products of the upper and lower plate to produce the heating panel by a vibration bonding process.

The vibration bonding process is performed under conditions of a bonding depth of 0.3 mm or more, a bonding pressure of 800 kg/cm² or more, a bonding time of 10 seconds or more, a vibration frequency of 50 Hz or more, and is preferably performed under conditions of 0.3 ~ 1.0 mm, a bonding pressure of 800 kg/cm² or more, a bonding time of 10 ~ 30 seconds, a vibration frequency of 50 ~150 Hz in order to prevent the fluid pathway from being blocked by resinous particles when using the heating panel for a long period of time, in which the resinous particles are formed of the molten plastic resin leaked into the inner fluid pathway upon bonding the upper and lower connecting members.

In accordance with another aspect of the present invention, a heating panel comprising upper and lower plates integrally formed to face each other so as to form an inner fluid pathway in which heating fluid flows, a plurality of connecting members, each symmetrically extending from the upper and lower plates toward the lower and upper plates, respectively, to connect the upper and lower plates to each other, the inner fluid pathway formed inside the plate by the plurality of connecting members, and two fluid communication portions to supply and discharge the heating fluid, wherein the fluid pathway has a uniform size and is uniformly arranged in the heating panel, and a bonding strength of the connecting member is at least 100 kg/cm² or more.

Advantageous Effects

Unlike the conventional method employing blow molding, the method of the present invention employs an injection molding process to manufacture a plate-shaped heating panel comprising an inner fluid pathway.

The injection molding process is a process to form a product by injecting molten resin into a cavity of a mold by using an oil pressure after heating and plasticizing a plastic material. The injection molding process provides various advantages of allowing formation of large volume products with various shapes, automation, and elimination of an additional finishing process as well as high productivity. In addition, the injection molding process enables insert manufacturing, combination of a reinforcement material (such as glass fiber, carbon fiber, etc.) with the resin, and in particular, enhancement in quality of products requiring precision.

One of the advantageous effects of the present invention is that the heating panel comprising the inner fluid pathway formed therein is manufactured using the injection molding process, so that the heating panel does not suffer from thickness variation, and is provided with a uniform fluid pathway, thereby ensuring smooth flow and high heating performance of heating fluid in the heating panel.

DESCRIPTION OF THE DRAWINGS

The above and other objects, features and other advantages of the present invention will be more clearly understood from the following detailed description taken in conjunction with the accompanying drawings, in which.

BEST MODE

Preferred embodiments of the present invention will be described in detail with reference to the drawings.

Figure 1:
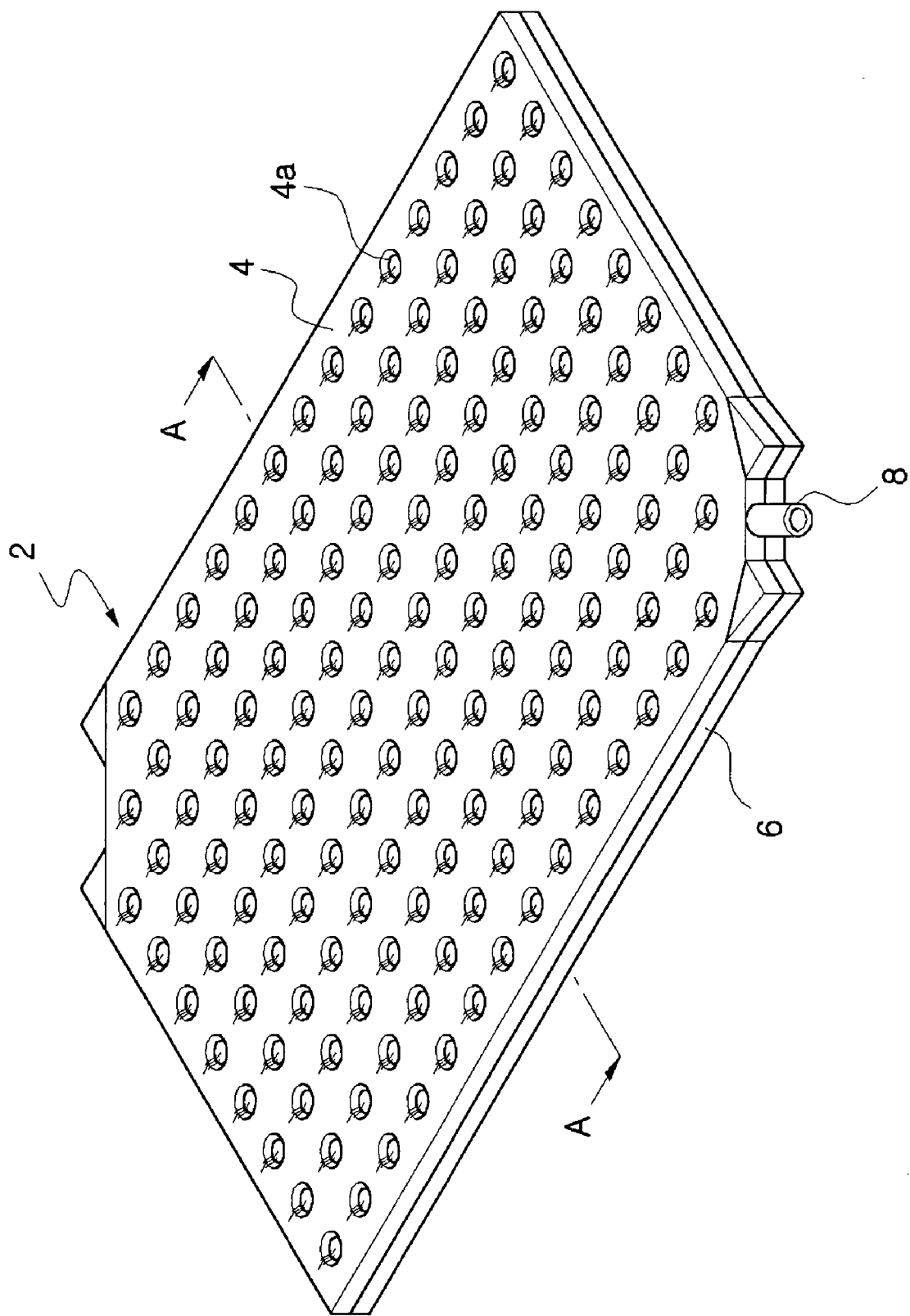
FIG. 1 is a perspective view illustrating a plate-shaped heating panel having an inner fluid pathway formed therein according to one embodiment of the present invention.
Figure 2:
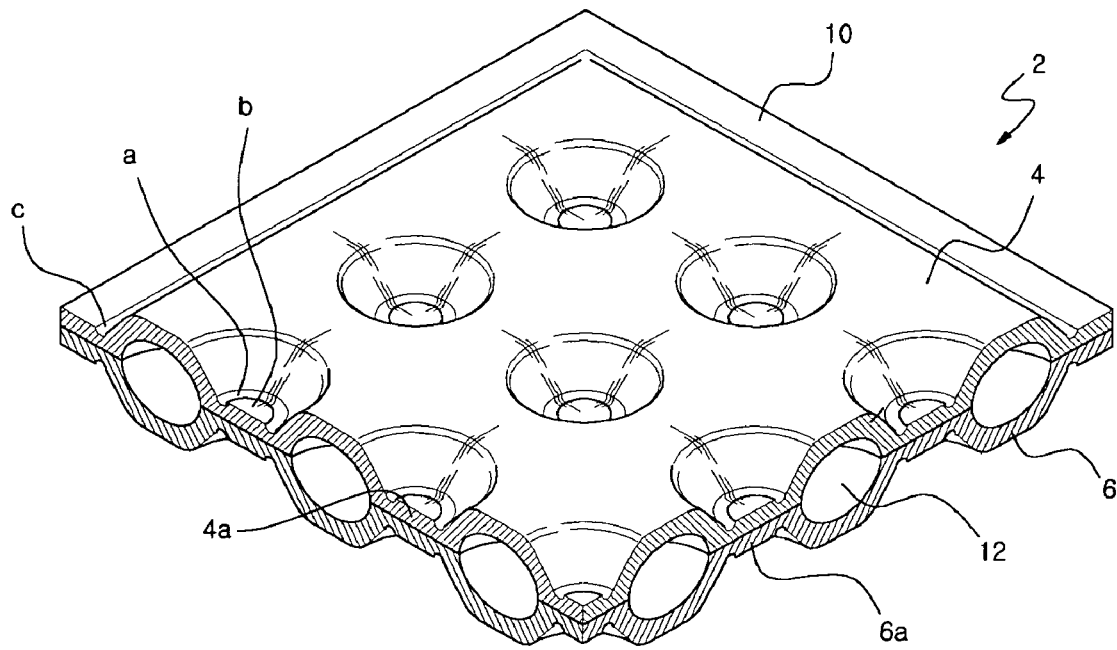
FIG. 2 is an enlarged cutaway perspective view of FIG. 1.

FIG. 1 is a perspective view illustrating a plate-shaped heating panel according to one embodiment of the present invention, and FIG. 2 is an enlarged cutaway view of FIG. 1. A heating panel 2 of the present invention comprises upper and lower plates 4 and 6 integrally formed to face each other, forming an inner fluid pathway 12 in which heating fluid flows. In order to allow easy manufacturing and forming, the heating panel 2 is made of a thermoplastic material, and has a flat plate shape in order to maximize surface contact with the floor (it is also applicable to a wall or a ceiling) of a room such that the heating fluid may contact the floor of the room over a larger area.

As shown in FIG. 1, the heating panel 2 has a rectangular structure with a pair of long sides and a pair of short sides. However, for easier continuous arrangement of the heating panels in construction of the heating system, the heating panel may have other polygonal structures, such as a hexagonal shape or an octagonal shape.

The heating panel 2 is integrally formed with two fluid communication portions 8 for supplying and discharging the heating fluid at two opposite corners of the heating panel 2 in a diagonal direction. The fluid communication portions 8 are fastened to other fluid communication portions of other heating panels by means of additional connecting members, respectively.

Fastening between the heating panels 2 can be performed by connecting panel-connecting portions 10 formed at respective sides of each of the heating panels 2 using additional fastening members.

Figure 3:
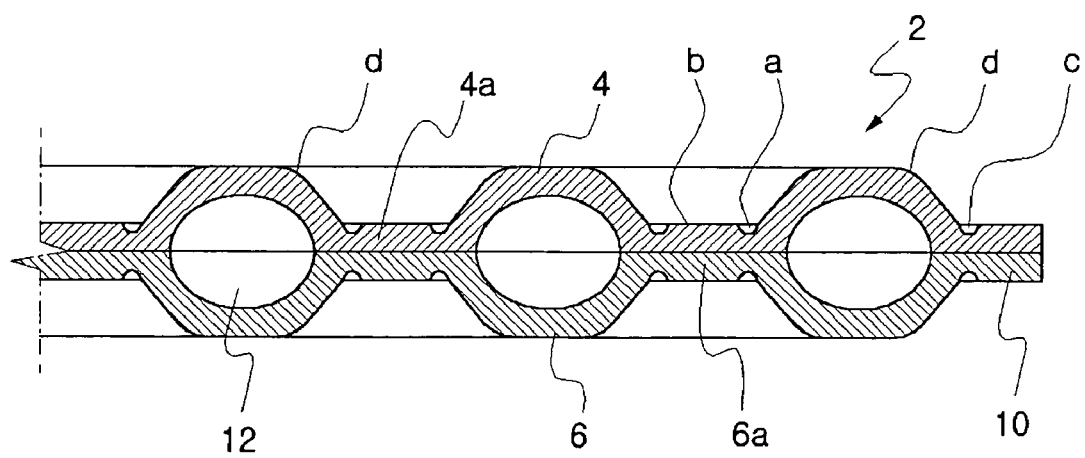
FIG. 3 is a cross-sectional view taken along line A-A of FIG. 1.

FIG. 3 is a cross sectional view taken along line A-A of FIG. 1, in which the upper and lower plates 4 and 6 are provided with a plurality of connecting members 4a and 6a and an inner fluid pathway 12. Among the connecting members 4a and 6a consisting of upper connecting members 4a and lower connecting members 6a, each of the upper connecting members 4a extends from the upper plate 4 to the lower plate 6 and each of the lower connecting members 6a extends from the lower plate 6 to the upper plate 4 such that the upper and lower connecting members 4a and 6a extend symmetrically, connecting the upper and lower plates.

The connecting members 4a and 6a serve not only to prevent the upper and lower plates 4 and 6 from being deformed due to an external force while supporting the upper and lower plates 4 and 6, but also to define the inner fluid pathway for allowing the heating fluid to flow therein while imposing resistance on flow of the heating fluid in order that the heating fluid may be uniformly distributed in the panel without being concentrated or retarded at a specific portion of the heating panel 2.

As shown in FIG. 3, the upper and lower connecting members 4a and 6a preferably have a circular cross-section. Alternatively, the upper and lower connecting members 4a and 6a may have other polygonal cross-sections, such as a rectangular cross-section, a hexagonal cross-section, and the like. The upper and lower connecting members 4a and 6a having a predetermined diameter are arranged in a predetermined pattern, and are spaced a predetermined distance from adjoining upper and lower connecting members 4a and 6a, respectively. The upper and lower connecting members 4a and 6a have cylindrical shaped negative angle structures, extending from the upper and lower plate 4 and 6, and having a diameter gradually decreasing from the upper and lower plate 4 and 6 to the bottom plane located at the center of the connecting members 4a and 6a.

Although the heating panel 2 of the present invention is integrally formed with the upper and lower plates 4 and 6, for convenience of description, the heating panel 2 is divided into the upper and lower plates 4 and 6, and the upper and lower connecting members 4a and 6a, centering on a central axis of the cross section in the horizontal direction. Furthermore, as the connecting members 4a and 6a extend from the upper and lower plates 4 and 6, respectively, the boundary between the upper and lower connecting members 4a and 6a will be defined from upper and lower portions d and d', where the upper and lower connecting members 4a and 6a start to extend from the upper and lower plates 4 and 6, to the bottom plane b of the upper and lower connecting members 4a and 6a, where the upper and lower connecting members 4a and 6a contact each other, connecting the upper and lower plates 4 and 6.

According to one embodiment of the present invention, in order to impart upper and lower portions of the inner fluid pathway 12 with a circular or elliptical shape, the upper and lower portions d and d', where the upper and lower connecting members 4a and 6a start to extend from the upper and lower plates 4 and 6, may be rounded. Furthermore, the upper and lower connecting members 4a and 6a may be formed with a groove structure, in which the upper and lower connecting members 4a and 6a are depressed at the circular-shaped periphery "a" of the bottom plane "b" of the connecting member 4a and 6a, respectively. Additionally, the heating panel 2 may be formed with protruded panel connecting members 10 at four sides of the heating panel 2, and each of the protruded panel connecting members 10 may be formed with a straight groove c in which a portion adjacent to the inner fluid pathway 12 is depressed. As such, with the cross-section of the inner fluid pathway formed to have the circular or elliptical shape, the pressure resistance of the heating panel 2 in a central heating system of a high-pressure can be remarkably enhanced.

Figure 4:
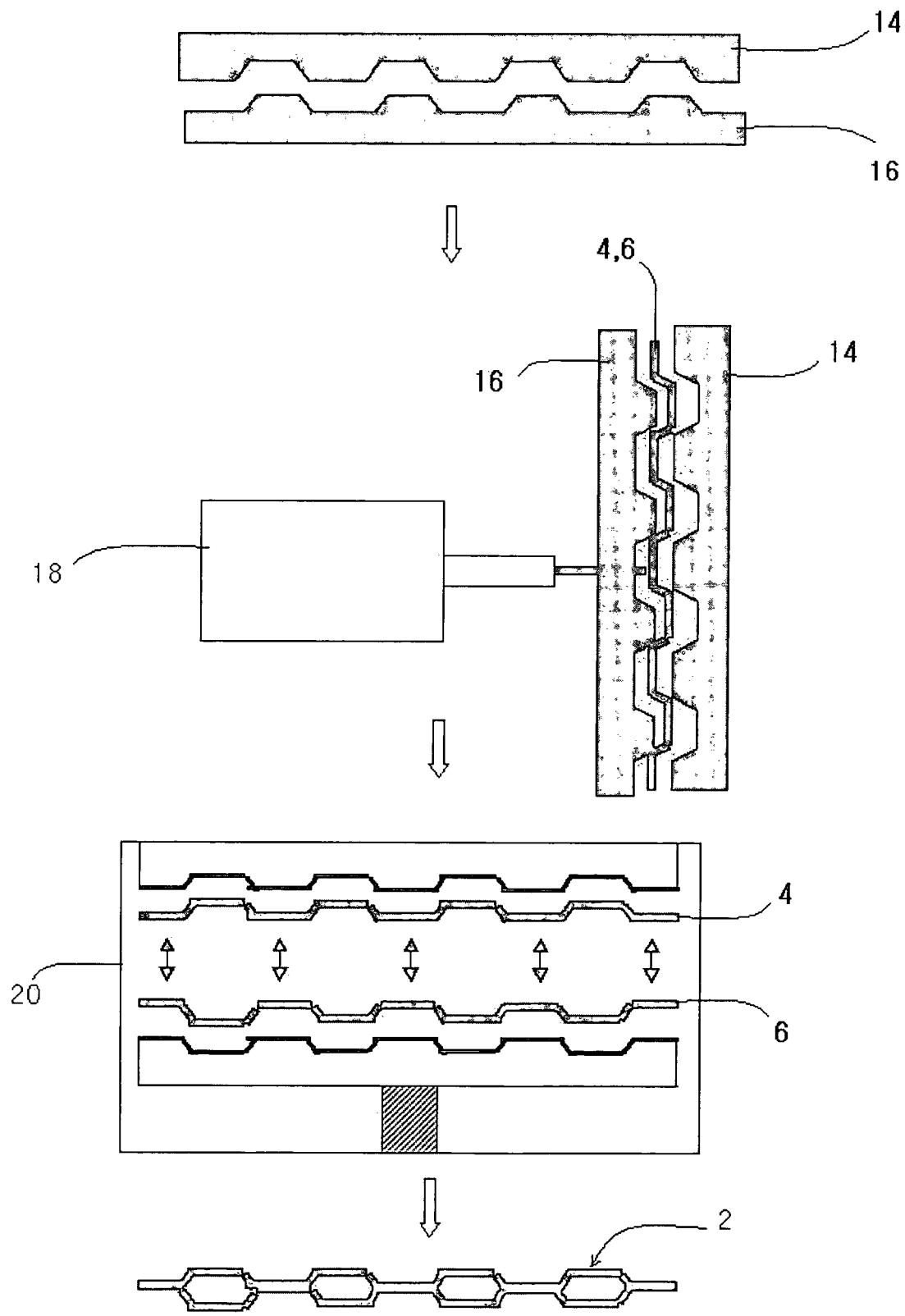
FIG. 4 is a schematic flow diagram illustrating a method for manufacturing the heating panel according to the present invention.

FIG. 4 is a schematic flow diagram illustrating a method for manufacturing the heating panel 2 according to the present invention, which comprises the steps of preparing upper and lower moulds, injection molding, and bonding. The steps of the method will be described in detail as follows.

First, upper and lower moulds 14 and 16 are prepared, which correspond to the shapes of upper and lower plates 4 and 6. Then, a plastic material is injected into a cavity between the upper and lower moulds 14 and 16 using an injection molding machine 18 to produce semi-manufactured products of the upper and lower plates 4 and 6. Finally, overall surfaces of the semi-manufactured products of the upper and lower plates 4 and 6 are bonded using a bonding machine 20 to produce the heating panel 2 according to the present invention.

At the injection molding step, the plastic resin is injected at a temperature of 200° C. or more, which is higher than melting point of the plastic material, and at a molding pressure of 100 kg/cm² or more into the cavity formed by the moulds 14 and 16 by the injection molding machine 18. The plastic resin is cooled for 50 seconds using cold water flowing in the moulds 14 and 16 to produce upper and lower plates 4 and 6. Then, the upper and lower plates 4 and 6 are sufficiently cooled for 24 hours or more by air, such that the plastic resin is cured to bond the upper and lower plates 4 and 6.

At the bonding step, a vibration bonding process is employed to prevent an inner fluid pathway 12 from being blocked by resin particles when using the heating panel for a long period of time, in which the resin particles are formed of the molten plastic resin leaked into the inner fluid pathway 12 upon bonding upper and lower connecting members 4a and 6a.

The vibration bonding process is a process which causes friction between two bonding surfaces with a frequency of a predetermined level or more to generate heat therebetween while applying a constant pressure to the bonding surfaces, and bonds the bonding surface with the heat. Since the vibration bonding process can be used for bonding large volume plastic materials of 200 mm or more for a short period of time, it is most suitable for manufacturing of the heating panel according to the invention.

Since a thermal bonding process causes leakage of the resin from the bonding surfaces, and provides very detrimental working conditions, other bonding processes are now employed. In this regard, since a supersonic bonding process dramatically increases manufacturing costs, it is not suitable in terms of cost. In addition, an RF bonding process and a rotational bonding process are not suitable for bonding of a square-shaped single component similar to the heating panel of the invention.

At the bonding step, when the upper and lower plates are bonded using the bonding machine 20 under conditions of a bonding depth of 0.3 ~ 1.0 mm, a bonding pressure of 800 kgf/cm² or more, a bonding time of 10 ~ 30 seconds, and a vibration frequency of 50 ~ 150 Hz, the heating panel having an excellent bonding strength and a uniform fluid pathway can be manufactured.

When the bonding depth is less than 0.3 mm or the bonding time is less than 10 seconds, the bonding strength between the components can be lowered, thereby deteriorating pressure resistance of the heating panel. Although the pressure is related to the frequency during the bonding step, when the bonding pressure is 800 kg/cm² or more, and the vibration frequency is 50 Hz or more, it is possible to secure good productivity.

Figure 5:
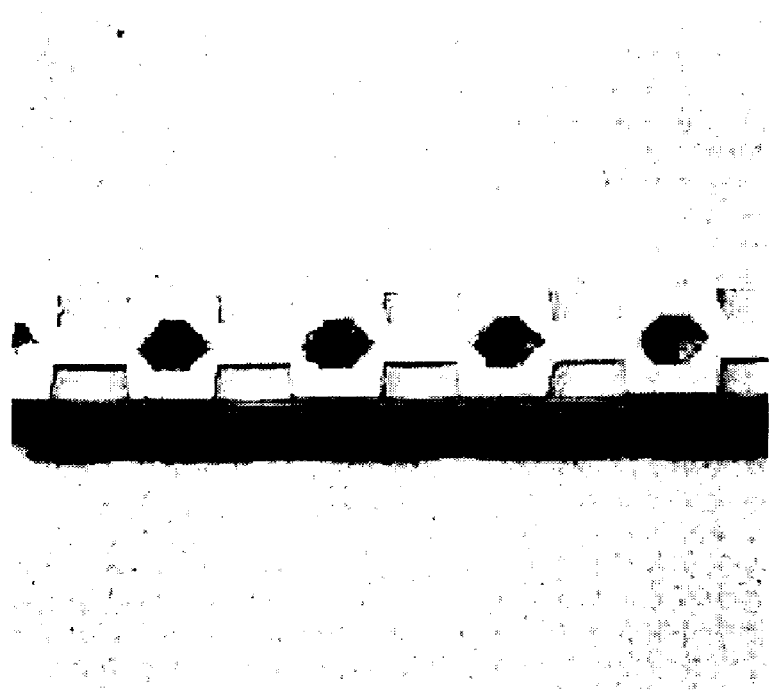
FIG. 5 is a photograph of a cross-section of the heating panel comprising a uniform inner fluid pathway of the present invention.

When manufacturing the heating panel using the method of the present invention, the heating panel has a uniform inner fluid pathway as shown in FIG. 5. On the other hand, when manufacturing the heating panel using the conventional method, the heating panel has a non-uniform inner fluid pathway as shown in FIG. 6.

Figure 6:
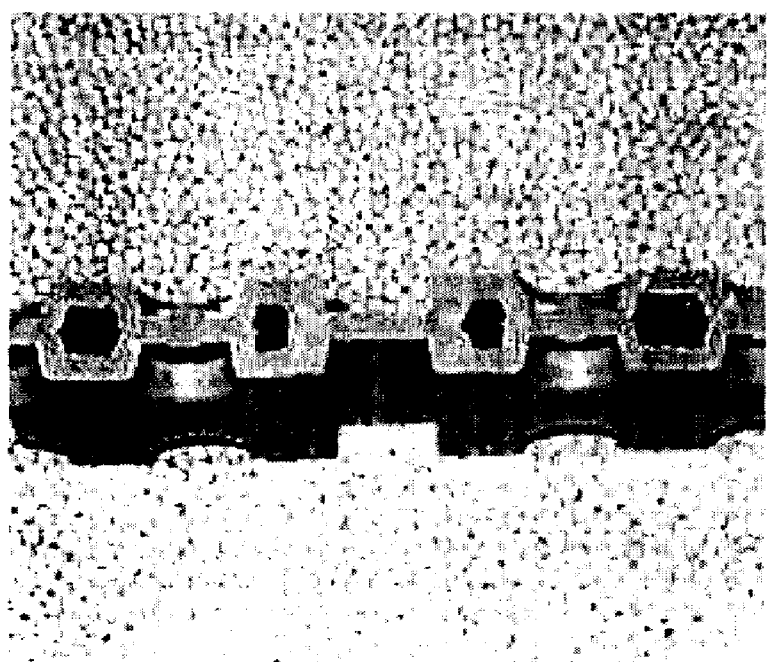
FIG. 6 is a photograph of a cross-section of a conventional heating panel comprising a non-uniform inner fluid pathway.

In Table 1, the bonding strength of a heating panel of the invention (Inventive Example) shown in FIG. 5 is compared with that of a conventional heating panel (Comparative Example) shown in FIG. 6. As can be appreciated from Table 1, the bonding strength of the heating panel according to the invention is about two times higher than that of the conventional heating panel.

TABLE 1

| Example No. | Inventive Example | Comparative Example |
| --- | --- | --- |
| Bonding strength | 130 kgf/cm² or more | 60~70 kgf/cm² |

[Note]
Bonding strength of connecting member indicates a force when bonding faces of connecting member are wholly separated from each other by mechanically separating the bonding faces at a velocity of 10 mm/min.

INDUSTRIAL APPLICABILITY

According to the present invention, a plate-shaped heating panel manufactured by the method of the present invention comprises a uniform fluid pathway formed therein by injection molding, so that blockage of the heating panel is prevented to ensure uniform flow of heating fluid. In addition, since upper and lower plates are formed to a uniform thickness by injection molding, the method of the present invention enables precise forming of the heating panel, thereby allowing a constant tolerance and high quality of the heating panel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for manufacturing a heating panel comprising upper and lower plates integrally formed to face each other so as to form an inner fluid pathway in which heating fluid flows, a plurality of connecting members, each symmetrically extending from the upper and lower plates toward the lower and upper plates, respectively, to connect the upper and lower plates to each other, the inner fluid pathway formed inside the plate by the plurality of connecting members, and two fluid communication portions to supply and discharge the heating fluid, which comprises:

preparing upper and lower moulds corresponding to the upper and lower plates;

injecting a plastic material into a cavity between the moulds to produce semi-manufactured products of the upper and lower plates; and bonding the semi-manufactured products of the upper and lower plates to produce the heating panel by a vibration bonding process, wherein the vibration bonding process is performed under conditions of a bonding depth of 0.3 mm or more, a bonding pressure of 800 kg/cm$^2$ or more, a bonding time of 10 seconds or more, and a vibration frequency of 50 Hz or more.

* * * * *